United States Patent
Ivanov et al.

(10) Patent No.: US 10,221,351 B2
(45) Date of Patent: Mar. 5, 2019

(54) COMPOSITE PROPPANT, METHOD FOR PRODUCING A COMPOSITE PROPPANT AND METHODS OF ITS APPLICATION

(71) Applicant: SCHLUMBERGER TECHNOLOGY B.V., The Hague (NL)

(72) Inventors: Maxim Grigorievich Ivanov, Novosibirsk (RU); Svetlana Anatolyevna Naydukova, Novosibirsk (RU); Olushola Horatio-da-Costa Shado, Mumbai (IN)

(73) Assignee: SCHLUMBERGER TECHNOLOGY CORPORATION, Sugar Land, TX (US)

( * ) Notice: Subject to any disclaimer, the term of this patent is extended or adjusted under 35 U.S.C. 154(b) by 0 days.

(21) Appl. No.: 15/318,707

(22) PCT Filed: Jun. 30, 2014

(86) PCT No.: PCT/RU2014/000474
§ 371 (c)(1),
(2) Date: Dec. 14, 2016

(87) PCT Pub. No.: WO2016/003304
PCT Pub. Date: Jan. 7, 2016

(65) Prior Publication Data
US 2017/0114273 A1    Apr. 27, 2017

(51) Int. Cl.
*C09K 8/80*  (2006.01)
*C09K 8/524* (2006.01)

(52) U.S. Cl.
CPC ............. *C09K 8/805* (2013.01); *C09K 8/524* (2013.01); *C09K 8/80* (2013.01); *C09K 2208/08* (2013.01)

(58) Field of Classification Search
CPC ........ E21B 43/26; E21B 43/267; E21B 43/25; E21B 33/138; E21B 47/1015; E21B 21/003; E21B 37/00; E21B 37/06; E21B 41/02; E21B 43/088; C09K 8/685; C09K 8/68; C09K 8/882; C09K 8/62; C09K 8/805; C09K 8/588; C09K 8/605; C09K 8/70; C09K 8/706; C09K 8/80; C09K 8/88; C09K 8/512; C09K 8/524; C09K 8/528; C09K 8/536; C09K 8/602; C09K 8/74; C09K 2208/12; C09K 8/5086; C09K 8/514; C09K 8/58; C09K 8/584; C09K 8/64; C09K 8/703; C09K 8/82; C09K 8/92; C09K 8/426; C09K 8/502; C09K 8/508; C09K 8/54; C09K 8/66; C09K 8/845; C09K 8/86; C09K 8/90
See application file for complete search history.

(56) References Cited

U.S. PATENT DOCUMENTS

| | | | | |
|---|---|---|---|---|
| 3,782,469 A * | 1/1974 | Fulford | ................ | C09K 8/528 166/279 |
| 4,986,353 A | 1/1991 | Clark et al. | | |
| 6,306,990 B1 | 10/2001 | Hien et al. | | |
| 7,931,089 B2 | 4/2011 | Miller et al. | | |
| 7,950,455 B2 | 5/2011 | Kaufman et al. | | |
| 2006/0185847 A1* | 8/2006 | Saini | ........................ | C09K 8/68 166/279 |
| 2009/0014176 A1* | 1/2009 | Miller | ..................... | C09K 8/62 166/280.1 |
| 2013/0025860 A1* | 1/2013 | Robb | ..................... | C09K 8/035 166/279 |
| 2014/0184228 A1 | 7/2014 | Fu et al. | | |

FOREIGN PATENT DOCUMENTS

| | | | |
|---|---|---|---|
| CA | 2941681 A1 | | 10/2015 |
| WO | 2009016545 A2 | | 2/2009 |
| WO | 2012036862 A1 | | 2/2009 |
| WO | WO2009/016545 | * | 2/2009 |
| WO | 2010021563 A1 | | 2/2010 |
| WO | WO2012/036862 | * | 3/2012 |
| WO | 2014105459 A1 | | 7/2014 |

OTHER PUBLICATIONS

Woo et al., "Long-Term Control of Paraffin Deposition", SPE 13126, 59th Annual Technical Conference and Exhibition, Sep. 16-19, 1984, 8 pages.
Gupta et al., "Solid Production Chemicals Added With the Frac for Shale, Paraffin and Asphaltene Inhibition", SPE 119393, SPE Hydraulic Fracturing Technology Conference, Jan. 19-21, 2009, 9 pages.
Smith et al., "Solid Paraffin Inhibitor Pump in Hydraulic Fracture Provides Long-Term Paraffin Inhibition in Permian Basin Wells", SPE 124868, SPE Annual Technical Conference and Exhibition, Oct. 4-7, 2009, 10 pages.
Gupta et al., "A 5-Year Survey of Applications and Results of Placing Solid Chemical Inhibitors in the Formation via Hydraulic Fracturing", SPE 134414, Annual Technical Conference and Exhibition, Sep. 19-22, 2010, 14 pages.

* cited by examiner

*Primary Examiner* — Kumar R Bhushan

(57) ABSTRACT

The disclosure relates to the oil and gas industry, in particular, to a composite proppant modified by a polymeric carrier for the purpose of improving transport properties and delayed release of inhibitors from proppant. A composite proppant is provided which comprises at least one solid particle attached to at least one polymeric carrier facilitating a decrease in the composite proppant settling rate, where the polymeric carrier comprises inclusions of at least one inhibitor for inorganic or organic scales. The disclosure also relates to a method for manufacturing of such composite proppant and methods for using the same during hydraulic fracturing of a subterranean formation, and for treatment of organic fossils during downhole production after hydraulic fracturing of subterranean formation.

10 Claims, 5 Drawing Sheets

COMPOSITE PROPPANT, METHOD FOR PRODUCING A COMPOSITE PROPPANT AND METHODS OF ITS APPLICATION

FIELD OF THE DISCLOSURE

This disclosure relates to the oil and gas industry, in particular, to the composite proppant modified by a polymeric carrier to improve transport properties and delayed release of inhibitors from proppant, to the method for manufacturing of such composite proppant and methods for using the same during hydraulic fracturing of subterranean formation, and for treatment of organic fossils during downhole production after hydraulic fracturing of subterranean formation.

BACKGROUND

Hydraulic fracturing, or simply fracturing of subterranean formation is aimed to creation of a high-conductive path (the fracture) through a reservoir (oil-bearing stratum) in order to stimulate hydrocarbons (oil and gas) inflow into a wellbore includes injection of fracturing fluid comprising proppant (also referred to as propping agent) particles with forming a pack within the treated reservoir. Such a proppant pack penetrates through the reservoir, while its permeability is much higher than that of the reservoir itself. Nevertheless, the permeability of an actual proppant pack created in the formation is lower compared to the expected permeability (of clean proppant pack) due to numerous nuance including the following:

1. Proppant embedment into fracture walls.
2. The residuals of fracturing fluid (gel fluid) partially blocking pores and creating a filter cake on the walls of fracture.
3. Inorganic scales formed in fracture and perforations during production of water with high salt content.
4. Organic scales formed in the fracture and perforations during production of oil with high content of heavy fractions of oil, such as paraffin wax and/or asphaltenes.
5. Insufficient transport of proppant into formation, namely, short length of proppant pack.

Nuance 1 and 2 are solved and mitigated during hydraulic fracturing design, and nuance 3 and 4 being addressed by downhole treatment in the event of production decline when impairment of well productivity is observed. If organic and inorganic scaling takes place, the scale inhibitors, in particular, paraffin wax and/or asphaltene inhibitors injected into formation during fracturing treatment may be employed. However, duration of such treatment is very short, because the chemicals injected are easily washed out from the formation and proppant pack during production stage, therefore the effectiveness of such treatments is rather low. In order to ensure high effectiveness of treatment against formation of the said scales, treating chemicals (the inhibitors) are added to the fluid at low concentrations (slightly higher than MIC, minimum inhibitor concentration) for a long period of time.

Moment 5 is related to poor transport properties of proppants in fracturing fluids. In particular, proppant settles in this fluid due to its higher density as compared to the proppant carrier fluid itself.

A decrease in proppant settling rate has been addressed in a number of patents and patent applications. Methods to decrease proppant settling rate may include the following:

1. Reduction in the effective density of particles.
2. Improved prevention of particles from settling through continuous fluid:
   (a) by adding fibers and other materials into the fracturing fluid, wherein particles interact with the said fibres and settle slowly in the fracturing fluid, and
   (b) by regulating the shape of proppant particles in such a way as to increase their "windage" (i. e. hydrodynamic resistance to motion of proppant particles through the fracturing fluid), which results in a lower settling rate of proppant particles in fracturing fluid and enhanced transport of proppant into a fracture.

Some literature sources disclose the structure and application of proppants (propping agents) with a certain polymer within proppant structure or within the system which is used for reservoir treatment.

Thus, Patents Nos. RU 2441052 C2 and U.S. Pat. No. 7,931,089 B2 (Schlumberger Technology Company), being members of the same patent family, describe proppant particles, a method of their use for reservoir treatment and a method of adjusting proppant settling rate, where a proppant particle is a central portion (core) and a shell. These patents set forth that the shell may be made of polymeric fibers, polymeric sponge or other material, while the shell material softer than the particle core; however, the chemical composition of shell material is not disclosed (in particular, polymer chemistry is not specified).

U.S. Pat. No. 7,950,455 B2 discloses nonspherical particles for well treatment, filled with water-solule or oil-soluble agent(s) and a method to stimulate a formation comprising introduction of these particles into a wellbore. The particles described therein have the following modifications:

hollow cylindrical proppant particles with the dimension ratio smaller than or equal to 5.0:1.0, which can be porous or nonpopous; and nonpopous cylindrical proppant particles with the dimension ratio smaller than or equal to 2.5:1.

In both cases, pores and holes in particles are filled with one or more chemical treatment agent specified in depending claims of U.S. Pat. No. 7,950,455 B2. In particular, agents are selected from group: scale inhibitors, corrosion inhibitors, paraffin inhibitors, demulsifiers, gas hydrate inhibitors, flocculating agents, dispersing agents, asphaltenes and any mixtures thereof.

Patent application WO 2012/036862 A9 discloses use of polymeric particles filled by at least one functional additive for formation treatment.

Patent application PCT/US2013/074955 owned by Schlumberger discloses a method of well treatment, wherein treatment slurry includes proppant particles and peel or composite peel with particles attached thereto. The peel material is selected from the group: polylactic acids, nylons, polyhydroxyalcanoates and polycaprolactones. The largest dimension of one or more peel or composite peel is from 10 micrometers (μm) to 20 millimiters (mm).

Plate-like particles were also claimed earlier as demonstrating excellent transport properties. In particular, Patent Application PCT/RU2008/000566 (WO 2010/021563 A1), filed by Schlumberger, mentions mica as a proppant for hydraulic fracturing. Mica geometry and buoyancy allow better proppant delivery into fractures. Nevertheless, it is known from experience that mica injection into a well does not result in a hydrocarbons production increase as compared to natural sand, which is explained by lower permeability of a proppant pack created by mica.

Additionally, there are numerous patents related to chemically modified proppants with various functions of proppant itself, but without its carrying parts (carrier). Also there are patents that disclose protection from organic and inorganic scales using chemical agents-inhibitors impregnated into proppant or coated with proppant pellet inhibitors. As for long-term protection against scales, two products are commercially available, such as: ScaleGUARD® (inorganic scales) by CARBO Ceramics Inc., (Houston, Tex., USA) and ParaSorb® (organic scales) by Baker Hughes (Houston, Tex., USA).

SUMMARY

This disclosure is aimed at simultaneous joint solution to the two basic moments:

(1) improvement of proppant transport properties (for example, improvement of proppant penetration into a formation during hydraulic fracturing), which is provided by forming polymeric proppant carrier into such a shape that ensures a lower proppant settling rate in fluid, such as fracturing fluid and/or produced fluid; and (2) delayed and/or slow release of chemical inorganic or organic scale inhibitors from proppant into fluid, such as fracturing fluid and/or produced fluid.

The first aspect of the present disclosure provides a composite proppant. The composite proppant comprises at least one solid particle attached to at least one polymeric carrier facilitating a decrease in the composite proppant settling rate, where the polymeric carrier comprises inclusions of at least one inhibitor for inorganic or organic scales.

The hydrodynamic radius of composite proppant in fluid is increased as compared to the hydrodynamic radius of a separate solid particle.

Ceramic particles (pellets) of proppant, natural particles of sand (sand grains) and/or other polymer-coated particles (grains) can be used as solid particles in a composite proppant. One or more solid particle in a composite proppant is attached to one or two polymeric carrier. A polymeric carrier in a composite proppant has substantially the shape selected from the group: disks, plates, stripes, spirals, bundle of fibers, fragment of net and fragment of film, or another shape differing from the spherical one, for example, selected from combinations of two or more of the said shapes. A polymeric carrier in a composite proppant comprises a soluble and/or degradable polymer. For example, a polymeric carrier in a composite proppant comprises a water-soluble or water-degradable polymer, or oil-soluble or oil-degradable polymer, or their combinations. A polymeric carrier in a composite proppant also comprises at least one polymer selected from the group comprising degradable polymers, such as polyesters, for example, polylactic acid, polyvinyl alcohol, nylon, polyethylene terephthalate, their combinations or derivatives. For example, a polymeric carrier in a composite proppant comprises one or more film-forming polymers. Also, a polymeric carrier in a composite proppant can comprise gelatin, casein, polyacrylic acid, polyacrylamide and/or guar (for example, guar powder can be added to another film-forming polymer). A solid particle in a composite proppant optionally has a coating comprising an inorganic or organic scale inhibitor and/or film-forming polymer. Further, a solid particle in a composite proppant is a porous particle. For example, such a solid particle in a composite proppant is impregnated by solution or melt of paraffin wax and/or asphaltene inhibitor. At least one inorganic or organic scale inhibitor in a composite proppant is a paraffin wax and/or asphaltene inhibitor. For example, the said inhinitor(s) is (are) selected from the group including ethylene/vinylacetate (ethylene vinylacetate, EVA) copolymer, ethylene/butylene copolymer, acrylic polymers, maleinic polymers, their derivatives. Inhibitors may also be presented by other commercially available products designed to perform this function, such as those disclosed in the documents mentioned in the "Background" section, as well as by combinations (mixtures) of two or more inihibitors.

The second aspect of the present disclosure provides a method for manufacturing a composite proppant according to the first aspect of the present disclosure.

The method for manufacturing a composite proppant comprises:

(a) producing a polymeric carrier with inclisons of at least one inorganic or organic scale inhibitor;

(b) attaching at least one solid particle to at least one polymeric carrier;

(c) dividing the produced polymeric carrier with at least one solid particle attached into smaller fragments.

At least one polymeric carrier is substantially produced using a shape selected from the group: disks, plates, stripes, spirals, bundle of fibers, fragments of net and fragments of film, or another shape differing from the spherical shape.

The stage of attaching in the proposed method is implemented by gluing or embedding of at least one solid particle to at least one polymeric carrier. The stage of devision in the proposed method is implemented by cutting.

The proposed method is also implemented as follows:
at stage (a), a polymeric carrier is produced in the form of a fiber net, and the produced net is cut to fragments; and
at stage (b), solid particles are coated with adhesive compound and mixed with the said net fragments, thus ensuring their sticking to each other.

The proposed method is also implemented as follows:
at stage (a), a polymeric carrier is produced in the form of film which is preliminarily prepared by applying an adhesive coating or by moulding to accomodate a solid particle;
at stage (b), solid particles are delivered to preliminarily prepared film, then the solid particles on the preliminarily prepared film are coated by another film layer of polymeric carrier, following which both films with solid particles between them are passed through roll mills, thus producing a sheet; and
at stage (c), the sheet produced at stage (b) is cut into fragments.

Additionally, the proposed method comprises the following stages:
mixing at least one inorganic or organic scale inhibitor and film-forming inhibitor to produce a mixture,
applying the produced mixture onto solid particles, and
subsequent drying of solid particles at film-forming temperatures to produce coating on the particles.

In the above embodiment of the method, the film-forming polymer is in the liquid state, while the solid particle is porous. Meanwhile, the produced mixture is applied onto porous solid particles through impregnation of a porous solid particle using solution or melt of paraffin wax and/or asphaltene inhibitor.

The third aspect of the present disclosure provides a method for hydraulic fracturing of a subterranean formation, the method comprising introduction of a composite proppant, manufactured according to the first aspect of the present disclosure or produced by the method according to the second aspect of the present disclosure, into a well.

The fourth aspect of the present disclosure provides a method for treatment of organic fossils during downhole production after hydraulic fracturing of subterranean formation. The method for treatment of organic fossils comprises release of the said at least one inhibitor based on a composite proppant, manufactured according to the first aspect of the present disclosure or produced by the method according to the second aspect of the present disclosure.

Thus, the present disclosure is aimed at provision of a long-run solution for preventing formation on inorganic or organic scales, for example, in a hydraulic fracture (in this case, solid particles of composite proppant, for example, those comprising the said inhibitors, could withstand fracture closure pressure) and, optionally, in perforations, completion and above ground installations (in such cases, solid particles of composite proppant may not withstand fracture closure pressure and may or may not contain the said inhibitors).

However, one embodiment of the present disclosure involves a composite proppant, wherein both a solid particle and polymeric carrier comprise inorganic or organic inhibitors, for example, paraffin and/or asphaltene inhibitors, the solid particle has porous core with outer coating applied onto it and the polimeric carrier has polymer matrix (substrate) comprising inclusions, while the said inhibitors are comprised in core pores of the proppant solid particle, in the outer coating of the proppant solid particle and in inclusions comprised in the polymer matrix of polymeric carrier. Such embodiment of the disclosure ensures longer protection against inorganic and/or organic scale deposition owing to delayed and/or slow release of inhibitors in a hydraulic fracture, formation and/or wellbore.

Therewith, the solution for inhibiting inorganic and organic scale formation in this embodiment of the present disclosure is represented by the fact that the said inhibitors comprised in a polymeric carrier, for examples, based on water or oil-soluble or degradable polymer are the first to be released from composite proppant, since they are more accessible for surrounding fluid;

the said inhibitors comprised in the outer coating of a solid particle are the second to be released from composite proppant, since they are less accessible for surrounding fluid compared to inhibitors in polymeric carrier; and the said inhibitors comprised inside the porous core of solid particle are the last to be released from composite proppant, after the outer coating of a solid particle is dissolved or degraded.

By means of this, a controlled time-spaced release of inhibitors from composite proppant can be implemented.

Therewith, the solution of improving transport properties of proppant is simultaneously provided owing to polymeric carrier or carriers facilitating a decrease in the proppant settling rate.

Transport properties of composite proppant of the disclosure surpass such properties of proppant solid particle, i.e. those of directly abrasive portion (propping core) of proppant, on which propping properties of proppant are based.

This disclosure also provides that the said scale inhibitors (for example, paraffin wax and/or asphaltene inhibitors) are embedded and distributed in the form of inclusions in the matrix (sheath) of slowly dissolving/degrading polymer. When such composite polymer is being injected into a subterranean formation, the settling (sedimentation) rate of the said particles in fracturing fluids is lower than the settling rate of initial solid particles owing to unique geometry of propping particles modified by polymeric carrier. As a result of degradation and/or dissolution of the said polymer, small (but sufficient) amount of the said inhibitors is relased into fluid, thus creating a such concentration of inhibitors in the fluid to prevent or reduce formation of inorganic and organic scales in a fracture, completion and above ground installations.

In addition, optional control over inhibitors release from composite proppant can be implemented by selecting various polymers with different degradation or dissolution rates for the polymeric carrier base, or different polymeric carriers for the outer coating and/or for introduction into the porous core of solid particle. Thus, combining different inhibitors (for example, those having different capability of inhibiting formation of scales or different scales) and/or different polymer bases (for example, those with different dissolution or degradation rate) and/or different amounts of inhibitors and/or polymer bases in different elements representing a composite proppant (i.e. in polymeric carrier or carriers, and in the outer coating and/or in the solid particle core), allows achieving the most diverse time dependence profiles of the released amount and/or released type of inhibitors, which can be useful in solving a wide range of the existing moments.

Thus, the embodiments of the present disclosure that are described in more detail below have the following advantages:

decrease in proppant settling rate in fluid, such as fracturing fluid and/or produced fluid, owing to the presence of the said at least one polymeric carrier; and protection against organic and inorganic scales as a result of introduction of appropriate inhibitors into polymeric carrier or, optionally, into the outer coating and/or porous core of solid particle.

As follows from the above, general advantages of the present disclosure involve the following:

(a) a higher level of hydrocarbons (oil and/or gas) production provided for a longer period of time, which is achieved through improved proppant penetration into a formation and through slower "overgrowing" of a proppant pack created in the formation during fracturing, by organic and inorganic scales; and (b) a longer period of time between downhole treatments owing to longer protection against inorganic and organic scales by means of delayed, slower and/or controlled release of inhibitors in completion and/or above ground installations.

In the meantime, it should be noted that the present disclosure is not limited to any specific embodiment, therefore, any combinations of any embodiments and features disclosed in this disclosure and claims can be advantageously used in the disclosure.

BRIEF DESCRIPTION OF THE DRAWINGS

Hereinafter, the present disclosure will be illustrated and described in more detail using the following drawings given as a non-limiting example.

FIG. 1a-1d are perspective views, and FIG. 1e is a cross-section view.

FIG. 2a-2d are perspective views, and FIG. 2e is a cross-section view.

FIGS. 3a, 3b and 3c are perspective views, and FIG. 3d is a cross-section view.

FIGS. 4a and 4b are perspective views, and FIG. 4c is a cross-section view.

DETAILED DESCRIPTION

Figure 1A:
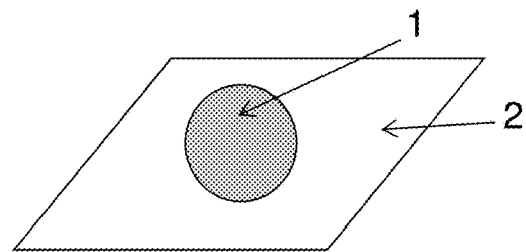
FIG. 1a-1e schematically show the first embodiment of composite proppant according to the present disclosure with one solid particle on a single continuous polymeric carrier, where
Figure 1B:
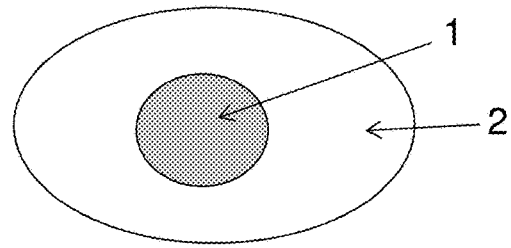
Figure 1C:
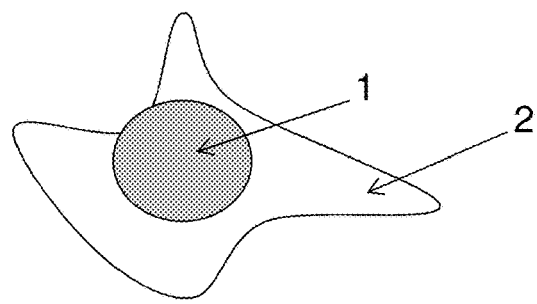
Figure 1D:
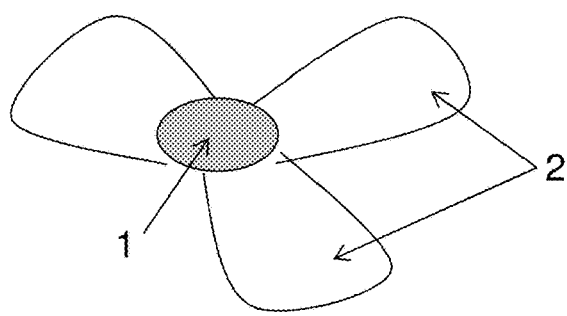
Figure 1E:
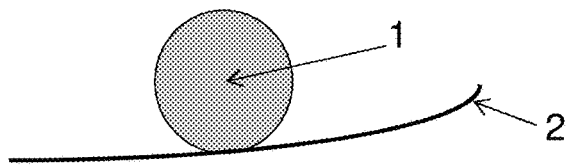

Hereinafter, certain exemplary embodiments of the present disclosure will be described in detail with reference to the above mentioned drawings and the examples given below.

The present disclosure discloses a composite proppant comprising at least one solid particle attached to at least one polymeric carrier facilitating a decrease in the composite proppant settling rate, while the polymeric carrier comprises inclusions of at least one inhibitor for inorganic or organic scales.

The term "composite proppant" as used in this disclosure means that proppant comprises at least two heterogenous portions which perform certain functions, namely, the carrying portion and the propping portion. The carrying portion of composite proppant is formed from at least one (i.e. one or a plurality of) polymeric carrier(s) of solid particle or particles and performs functions of improving proppant transport properties, facilitating a decrease in the settling rate (slowdown) of composite proppant and inhibiting formation of inorganic or organic scales, while the propping portion of composite proppant is formed from at least one (i.e. one or a plurality of) proppant solid particle(s) and performs the composite poppant propping function as such or, optionally, the function of additional inhibiting formation of inorganic or organic scales.

The term "inorganic or organic scale inhibitor" in this disclosure is considered to mean the following chemical agents: substances suppressing growth of crystals of paraffin wax and asphaltenes, paraffin wax and asphaltene dispersants, paraffin wax and asphaltene crystal growth modifiers, scale detergents, as well as inorganic scale inhibitors having polymeric or inorganic nature.

The term "solid particle" in this disclosure is considered to mean a separate particle of natural proppant (for example, sand) or artificial proppant (for example, sintered ceramic material) having sufficient strength to be used in hydraulic fracturing or gravel-packing operations. Thus, "solid particles" mean sand, ceramic proppant or polymer-coated artificial proppant. Such properties of proppant particles as their strength and dimensions can comply with ISO 13503-2:2006(E) standard "Petroleum and natural gas industries. Completion fluids and materials. Part 2. Measurement of properties of proppants used in hydraulic fracturing and gravel-packing operations". Thus, Table B.4 of this ISO standard defines particle classification after strength testing (classification from 1K to 15K). The concept of particles sufficient strength during testing means destruction of less than 10% of particles under work load (the table provides the range of test loads from 6.9 MPa to 103 MPa). At this point, it should be noted that the strength of "solid particle" in a composite proppant is much higher compared to the strength of "polymeric carrier" which performs quite different functions (improvement of proppant transport properties and scales suppression).

For example, at least one polymeric carrier and/or outer coating of solid particle in a composite proppant is (are) based on a film-forming polymer. The term "film-forming polymer" in this disclosure is considered to mean a natural or synthetic polymer, which exists in the form of film at working temperatures. In other words, a film of such polymer has sufficient process strength to serve as a basis for producing the said polymeric carrier, to which solid particle(s) is (are) attached. Polymer manufacturer specifications define the form of delivery, namely, in the form of film, rolls, polymer network, etc. Examples of film-forming polymers include foodstuff protection films and polyphosphazene film-forming polymers with low-temperature polymerization (see Handbook of Polymer Synthesis: Part B (In Two Parts), by Hans R. Kricheldorf, CRC Press, 1991, P. 1087). Latex polymers are another example of oil-soluble film-forming polymers on the basis of latex (latex film is formed at low temperatures). The majority of polymers suitable for being applied onto proppant particles are film-forming ones. The "film-forming polymer" concept is widely used in polymer technologies (see, for example, U.S. Pat. No. 6,306,990 B1 named "Film-forming polymers", published on Oct. 23, 2001).

The term "settling rate of composite proppant" is defined as the depth of a fluid-filled narrow channel divided by the time of proppant particle travel from the fluid surface to the channel bottom (i. e. the speed at which a particle sinks in fluid), see examples.

The present disclosure provides for the use of a propping agent modified with polymeric carrier (hereinafter referred to as "modified propping agent") with scale inhibitors (for example, paraffin and/or asphaltene inhibitors) embedded in polymeric carrier(s), and impregnated into the propping agent particles and/or applied onto the surface of propping agent particles as the outer coating. The said inhibitors are considered to mean chemical compositions (compounds, mixtures), which reduce/suppress/prevent growth of crystals of paraffin wax and asphaltenes and can include parraffin crystal modifiers, paraffin dispersants, chemicals reducing hydraulic pressure losses (WDFI), as well as compounds reducing the cloud point, oil chilling temperature (pour point), cold filter plugging point for liquid (fluid) recovered from an oil-bearing (producing) formation (reservoir). Hereinafter, such scale inhibitors are referred to just as "inhibitors".

The said composite proppant can be injected into a subterranean formation (reservoir) along with fracturing fluid as a propping agent such as sand or ceramic propping agent. After injection of composite proppant along with fracturing fluid, proppant placement in a fracture created as a result of hydraulic fracturing and commencement of hydrocarbons production, heavy scales (deposits) of paraffin wax and/or asphaltene can start forming in the fracture. However, the presence of composite proppant with inhibitors reduces the rate of such scale formation thus maintaining high hydraulic fracture conductivity for the hydrocarbons produced. An additional option is provided by the presence of inhibitors that continuously release from composite proppant and settle in perforations, completion and above ground installations, thus reducing the rate of forming such paraffin wax and asphaltene deposits in these zones.

According to the present disclosure, a composite proppant can be injected into a subterranean formation along with fracturing fluid in the form of slurry. During injection of such slurry into subterranean formation and in the course of proppant placement in the formation, a polymeric carrier, owing to its special shape, prevents a modified propping agent from premature setting by forming a proppant pack. Under specific time and temperature conditions after fracture closure, polymer(s) comprised in the polymeric carrier start to degrade slowly with the designed rate, and inhibitors release from polymeric carrier thus providing reduction of both inorganic and organic scales formation.

The said polymeric carrier can be produced from degradable polymers, such as polylactic acid, polyvinyl alcohol, guar, nylon, polyethylenterephthalate (PET) and modifications or derivatives thereof.

Several various embodiments of the disclosure are considered below taking into account distinctions in the amount, shape and structure of polymeric carrier and in the quantity, shape and structure of solid particles, as well as relative positions and consolidation of solid particles and polymeric carrier.

First Embodiment of Composite Proppant

In the first embodiment shown schematically in FIG. 1a-1e, a composite proppant comprises one solid particle 1 (for example, an arbitrarily-shaped sand grain or a ceramic pellet having near-spherical or near-elliptic shape), glued or otherwise attached to one polymeric carrier 2, where polymeric carrier 2 is a solid plate having rectangular, round, elliptic, trilobal or irregular shape with inclusions of inhibitors. Shape, dimensions and their relation between solid particle 1 and polymeric carrier 2 are not restricted specifically subject to ensuring the possibility of intended use of composite proppant. At least one dimension of polymeric carrier is greater than at least one dimension of solid particle to increase hydrodynamic resistance to motion of a composite proppant particle in fluid. At least two dimensions of polymeric carrier are greater than the largest dimension of solid particle. For example, as shown in FIG. 1a-1e, overall dimensions of polymeric carrier in length and width are greater than the largest overall dimension of solid particle. Dimensions of solid particle can vary, for instance, from 10 micrometers (μm) to 20 millimiters (mm), or from 0.05 mm to 2 mm. The adhesive compound that probably glues solid particle 1 to polymeric carrier 2, is not shown in FIG. 1a-1e for clarity.

Second Embodiment of Composite Proppant

In the second embodiment shown schematically in FIG. 2a-2e, a composite proppant comprises not one but several solid particles 1 (for example, arbitrarily-shaped sand grains or ceramic grains or pellets having near-spherical or near-elliptic shape), glued or otherwise attached to one polymeric carrier 2, where three solid particles are shown just by way of example, though two or more than three solid particles 1 can be glued to one polymeric carrier 2, while different quantities of solid particles can be glued to different polymeric carriers and in different (for example, arbitrary) places of polymeric carrier in the composite proppant being injected into a well along with fracturing fluid and comprising a plurality of such composite particles or essentially composed of such composite particles. Otherwise, the composite proppant according to the second embodiment can be similar to the composite proppant according to the first embodiment, for example, in terms of shape, dimensions and relations between them for polymeric carrier and solid particles and in terms of the fact that polymeric carrier can be a solid plate having rectangular, round, elliptic, trilobal or irregular shape with inclusions of inhibitors. The adhesive compound that, probably, glues solid particles 1 to polymeric carrier 2, is not shown in FIG. 2a-2e for clarity.

Third Embodiment of Composite Proppant

Figure 3A:
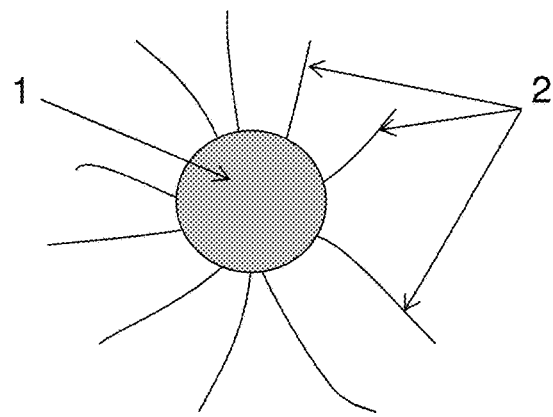
FIG. 3a-3d schematically show the third embodiment of composite proppant according to the present disclosure with one solid particle on a fibrous or network polymeric carrier, where
Figure 3B:
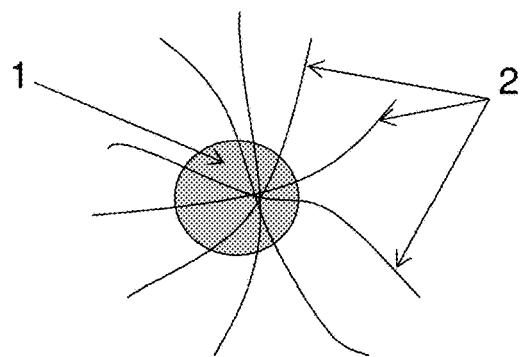
Figure 3C:
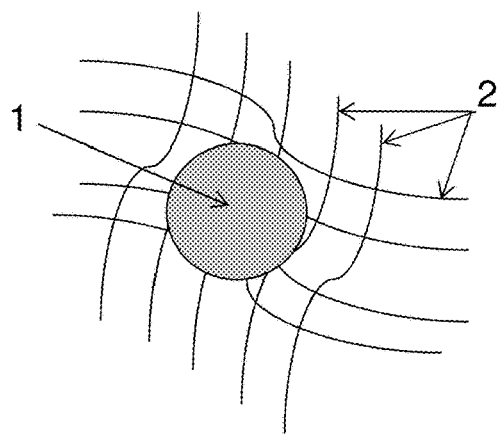
Figure 3D:
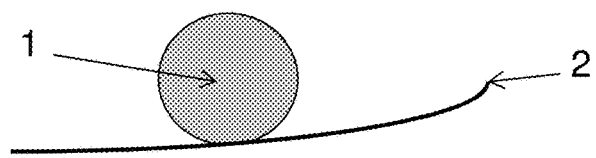

In the third embodiment shown schematically in FIG. 3a-3e, a composite proppant comprises one solid particle 1 (for example, an arbitrarily-shaped sand grain or a ceramic pellet having near-spherical or near-elliptic shape), glued or otherwise attached to one polymeric carrier 2, though, in this case, polymeric carrier is a fiber bundle or net. FIG. 3a and FIG. 3b show opposite sides of the same polymeric carrier 2 made in the form of a fiber bundle secured in one surface area of a solid particle, where different fibers in the bundle extend in different radial directions from this solid particle. Polymeric carrier 2 shown in FIG. 3c is also made of fibers, though here the fibers form a net. Though a woven net with mutually perpendicular fibers is shown in this case, the present disclosure can also make use of woven nets with other types of weaving, or nonwoven nets with arbitrary or some ordered orientation of fibers (not shown). Therewith, at least one fiber of polymeric carrier (or many fibers for the most part) of polymeric carrier comprise inhibitor inclusions. It is also possible that inhibitor inclusions are one or more fiber composed of inhibitors and introduced in the above bundle or net among other fibers without inhibitors. Further, a bundle or a net can be attached more than in one surface area of a solid particle, where fibers in the bundle or net can extend in the same or different directions. Moreover, the composite proppant according to the third embodiment can be similar to the composite proppant according to the above first and second embodiments, for example, in terms of shape and dimensions of solid particle 1 and relations between shape and dimensions of polymeric carrier 2, and in terms of the fact that two or more solid particles 1 can be attached (glued) to one polymeric carrier 2, while different quantities of solid particles 1 can be attached to different polymeric carriers 2 and in different (for example, arbitrary) places of polymeric carrier 2 in the composite proppant being injected into a well. The adhesive compound that, probably, glues solid particle(s) 1 to polymeric carrier 2, is not shown in FIG. 3a-3e for clarity.

Fourth Embodiment of Composite Proppant

Figure 4A:
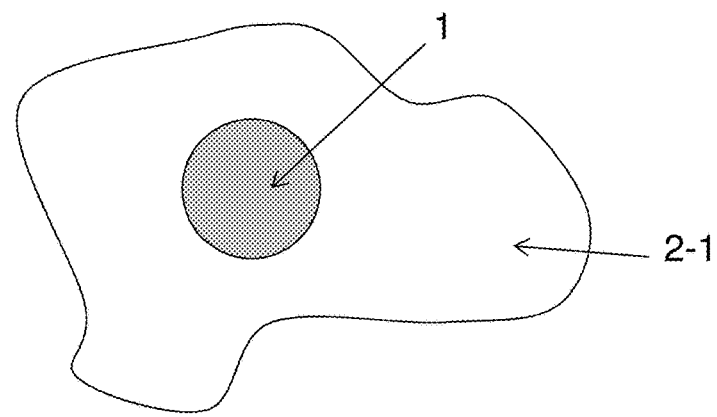
FIG. 4a-4c schematically show the fourth embodiment of composite proppant according to the present disclosure with one solid particle and two continuous polymeric carriers forming a continuos shell around this solid particle at different stages of the method of manufacturing this proppant, where
Figure 4B:
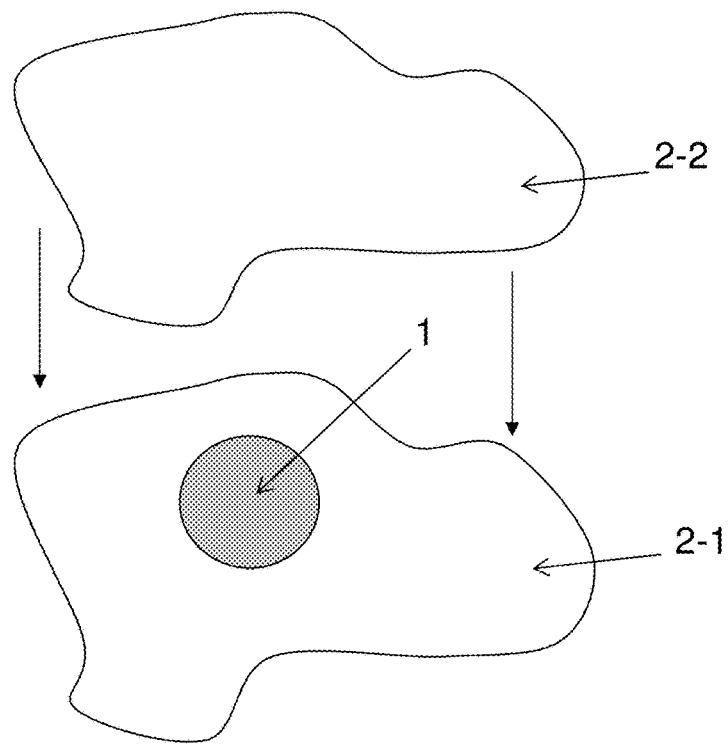
Figure 4C:
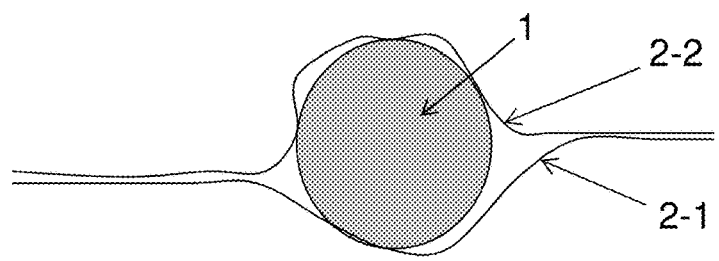

In the fourth embodiment shown schematically in FIG. 4a-4c, a composite proppant comprises one solid particle 1 (for example, an arbitrarily-shaped sand grain or a ceramic pellet having near-spherical or near-elliptic shape) included between two polymeric carriers 2-1 and 2-2, any of which is a solid plate or film, where inhibitor inclusions are comprised in at least one of two polymeric carriers 2-1 and 2-2 (and in both carriers for the most part).

FIGS. 4a, 4b and 4c show successive stages of the method for manufacturing such composite proppant. At the first stage, solid particle 1 is applied (laid) onto first polymeric carrier 2-1, as shown in FIG. 4a. At the second stage, solid particle 1 placed on first polymeric carrier 2-1 is overlaid with second polymeric carrier 2-2, as shown in FIG. 4b. At the third stage, first and second polymeric carriers 2-1 and 2-2 are pressed to solid particle 1, thus producing a shell (continuous or nontinuous) formed by two polymeric carriers 2-1 and 2-2 around solid particle 1, as shown in FIG. 4c.

The composite proppant according to this embodiment can be similar to the composite proppant according to the above first, second or third embodiments, for example, in terms of relations between dimensions of solid particle 1 and polymeric carriers 2-1 and 2-2, and in terms of the fact that two or more solid particles 1 can be included between two polymeric carriers 2-1 and 2-2, that one or both polymeric carriers 2-1 and 2-2 can be made in the form of a bundle or net of fibers, and that different quantities of solid particles 1 can be included between discrete fragments (layers) of polymeric carriers 2-1 and 2-2 and in different (for example, arbitrary) places between polymeric carriers 2-1 and 2-2 in the composite proppant as a whole.

Fifth Embodiment of Composite Proppant

The composite proppant according to the fifth embodiment can be similar to the composite proppant according to any other embodiment, for example, to any of the above first, second, third and fourth embodiments or any principally possible combination thereof, except for the shape of at least one solid particle 1.

Figure 5A:
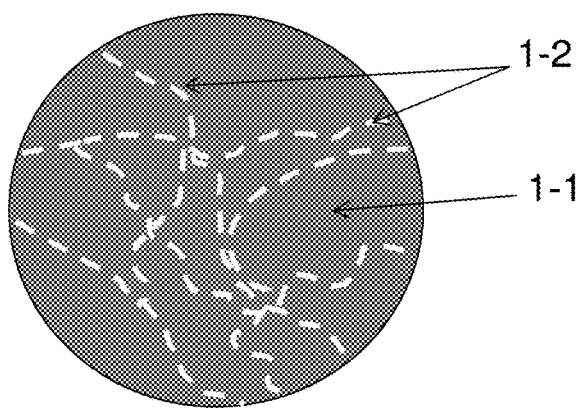
FIG. 5a-5c schematically show cross-section views of a composite proppant solid particle according to the fifth embodiment of the present disclosure.

In the first sub-embodiment of composite proppant according to the fifth embodiment shown schematically in FIG. 5a, solid particle 1 is a porous particle (core) with open porosity, having continuous areas (walls) 1-1 and pores 1-2 designated schematically by white spot sequences. For example, pores 1-2 of the solid particle core comprise inhibitors embedded (impregnated) in pores 1-2, e.g., through impregnating the porous core of solid particle with solution or melt of inhibitors. In so doing, the pores can be fully or partially filled with inhibitors. Such impregnated inhibitors can reduce/prevent growth of crystals of paraffin wax and/or asphaltenes on proppant, thus maintaining high fracture conductivity. Inhibitors presence in pores provides slow release (slow yield) of inhibitors, so the duration of treatment effect is much longer compared to inhibitors that are simply injected into a formation in the form of solution.

Figure 5B:
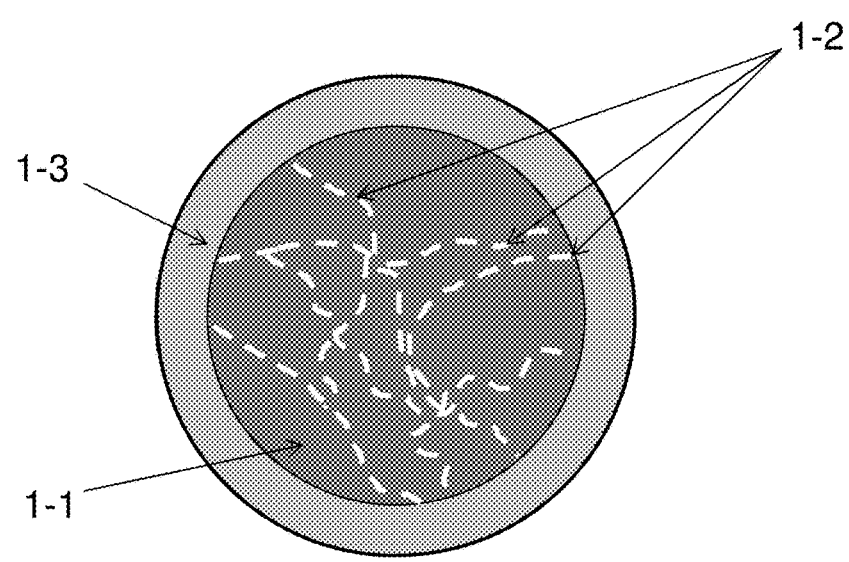
Figure 5C:
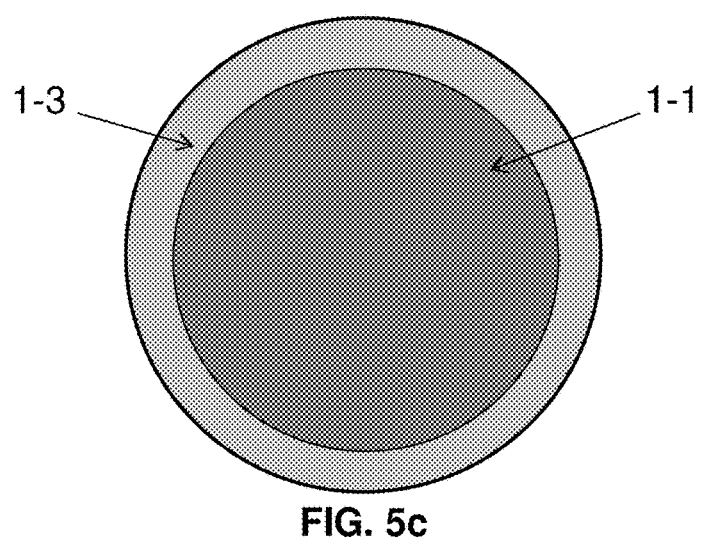

In the second sub-embodiment of composite proppant according to the fifth embodiment shown schematically in FIG. 5b, solid particle 1 is similar to the above first sub-embodiment except that it is additionally furnished with outer coating. That is, solid particle 1 is also a porous particle (core) with open porosity, having continuous areas (walls) 1-1 and pores 1-2 designated schematically by white spot sequences, though it is additionally furnished with outer coating 1-3. Outer coating 1-3 comprises inhibitors, for example, it is based on a film-forming polymer with inhibitor inclusions, or it is generally made of inhibitors. The outer coating at least partially covers the impregnated (saturated) solid particle of proppant. The outer coating (shell) can have various compositions including water and/or oil-soluble or degradable polymers, including, among others, polylactic acid, polyglycolic acid, gelatin, casein, polylactide, polyvinyl alcohol, polyacrylic acid, polyacrylamides, polyethylene glycol and combinations thereof (compositions). During polymer degradation or dissolution, inhibitors are released into the produced fluid, following which at least part of the released inhibitors settle on the surface of perforations, completion and piping, thus reducing or preventing formation of organic scales on them. Meanwhile, so long as dissolution and/or degradation of outer coating polymer(s) proceed, at least some pores prove to be open, therefore, inhibitors impregnated in these open pores of solid particle start releasing, thus preventing formation of paraffin wax and asphaltene crystal scales, similar to the first sub-embodiment.

In the third sub-embodiment of composite proppant according to the fifth embodiment shown schematically in FIG. 5b, solid particle 1 is nonporous propping core (substrate) 1-1 with outer core 1-3, comprising the above inhibitors or composed of them as in the above second sub-embodiment. Outer coating 1-3 can, at least partially, cover core 1-1 (i.e. cover the entire core surface, or a part thereof). At the same time, it is also possible to use porous core without inhibitors in the pores, the surface of which is coated with the above outer coating. Anyhow, inhibitors covering, at least partially, the surface of the proppant solid particle core reduce formation of organic scales in a proppant pack (i.e. proppant barrier or pack in a hydraulic fracture). Meanwhile, the possibility of releasing inhibitors from the outer surface of solid particle can also be provided by any of the above-described variations according to the second sub-embodiment and can lead to the same advantages that are disclosed in the above second sub-embodiment.

However, it should also be noted that in the event of quick removal of polymeric carrier and/or outer coating from composite proppant (for example, if it is exposed to strong abrasive action inside a fracture), the propping core is directly affected by hydrocarbons, therefore, it is recommended that the core be porous and impregnated with inhibitors.

The present disclosure is additionally illustrated by exemplary embodiments given below.

EXAMPLES

Example 1. Inhibitor Impregnation into Proppant Pores and Proppant Coating with Inhibitor Impregnation of inhibitor(s) in proppant particle pores and, alternatively, at least partial proppant coating with inhibitor can be carried out as follows:
  dissolve an inhibitor in a solvent if the inhibitor is solid;
  mix proppant with the inhibitor solution; and
  allow the solvent to dry up.

While the solvent is evaporated, it is recommended to stir the mixture of proppant and inhibitor solution so that the mixture and, as a result, impregnation and coating become more homogeneous.

Alternatively, it is proposed to reduce the pressure over the porous proppant before the above mixing at the $2^{nd}$ stage in order to create negative pressure in pores, thereby facilitating income of solution into the pores and, thus, improving the quality of impregnation.

Example 2. Coating of Proppant with Polymer Containing Inhibitor

Applying inhibitors onto the proppant surface in the form of compounds included (embedded) in water-soluble or water-degradable polymer can be carried out as follows:
  if an inhibitor is available in the solid state, dissolve the solid inhibitor in a solvent;
  mix a water-degradable polymer (for example, polylactic acid) with the inhibitor solution in the solvent;
  add proppant to the inhibitor solution and water-degradable polymer in the solvent; and
  allow the solvent to evaporate.

While the solvent is evaporating, it is recommended to stir the mixture of proppant and inhibitor solution with water-degradable polymer so that the mixture and, as a result, impregnation and coating become more homogeneous.

Example 3

Manufacturing a composite proppant according to the first and second embodiments can be carried out using the following stages:
- producing a large polymer plate with introduced inhibitor(s) inclusions;
- gluing proppant particles to a large polymer sheet; and
- dividing the large sheet with proppant particles glued thereto into small pieces.

Example 4

Manufacturing a composite proppant according to the first and second embodiments can be carried out using the following stages:
- producing a large polymer sheet with introduced inhibitor(s) inclusions;
- cutting the large sheet into small plates;
- applying glue to proppant particles; and
- mixing the proppant particles with small sheets resulting in their sticking to each other.

Example 5

Manufacturing a composite proppant according to the third embodiment can be carried out using the following stages:
- producing a polymer network made of fibers comprising inhibitor(s);
- forming small network fragments (for example, by tearing or cutting); and
- gluing proppant particles to small network fragments.

Example 6

Manufacturing a composite proppant according to the fourth embodiment can be carried out using the following stages:
- producing a polymer film with introduced inhibitor(s) inclusions;
- feeding proppant particles through a feeder to the lower polymer film layer that is preliminarily prepared and has an adhesive coating or is slightly moulded;
- laying the second upper polymer film layer onto the lower polymer film layer with propping agent particles applied and passing them through roll mills; and
- cutting the produced sheet with embedded proppant particles into fragments.

Experimental Examples

Methods for manufacturing a composite proppant with carrier based on film-forming polymer in laboratory conditions Equipment
Drying furnace
Dishware and Tools
Pipette, 10 ml
Brush, spatula
Plastic glass, 250 ml
Ceramic round-bottomed cup, 250 ml
Petri dishes with diameter of 10 cm, 8 cm
Analytical balances
Scissors, cutter, lancet
Forceps
Weighing cup
Materials The following items were tested as a carrier based on film-forming polymer:
water-soluble film GUNOLD® Solvy® 80μ, article No. 40425 (based on polyvinyl alcohol), and
polyamide film.

Several variations of propping agent in the form of solid particles being a part of composite proppant were tested including:
CarboProp 1620® (average diameter of particles is 1.05 mm).
CarboProp 1218® (average diameter of particles is 1.4 mm).
CarboProp 3060® (average diameter of particles is 0.5 mm).
BadgerS and 2040® (average diameter of particles is 0.58 mm).
ForeProp 1630® (average diameter of particles is 1.0 mm).
OptiProp G2 2040® (polymer-coated proppant).
Epoxy adhesive for gluing propping agent particles to polymer film.
Woven sheet made of polylactic acid (PLA) fibers, class 6202D, manufactured by NatureWorks LLC (Minnetonka, the USA).
PLA fibers (wound bundle), class 6202D, manufactured by NatureWorks LLC.

Method for Manufacturing Composite Proppant Shown in FIG. 1a.

Water-soluble film GUNOLD® Solvy® was cut by scissors to square pieces of size 3×3 mm.
A weighed quantity of ceramic proppant was taken.
A small square of film (being polymeric carrier) was taken by forceps, after which a film surface area (its central part) was wetted with epoxy adhesive using pipette or brush.
A proppant particle was placed in the wetted film surface using forceps.
Items 3 to 4 were repeated, until a sufficient amount of test sample was produced.
The composite particles produced were dired up in a Petri dish placed in the drying furnace at temperature of 40-60° C.

Figure 2A:
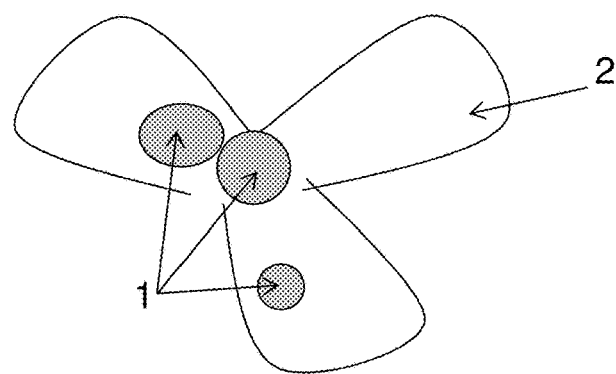
FIG. 2a-2e schematically show the second embodiment of composite proppant according to the present disclosure with three solid particles on a single continuous polymeric carrier, where
Figure 2B:
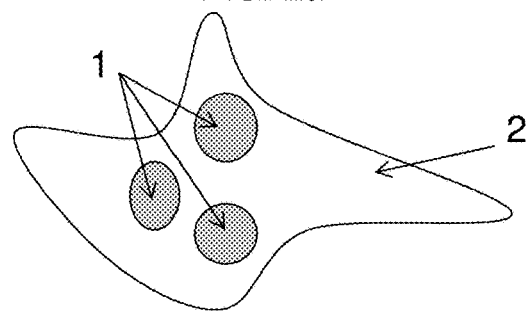
Figure 2C:
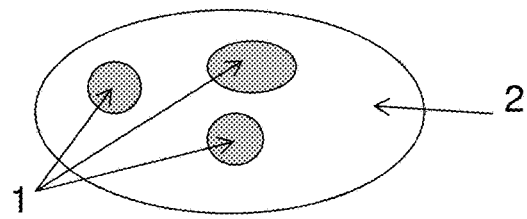
Figure 2D:
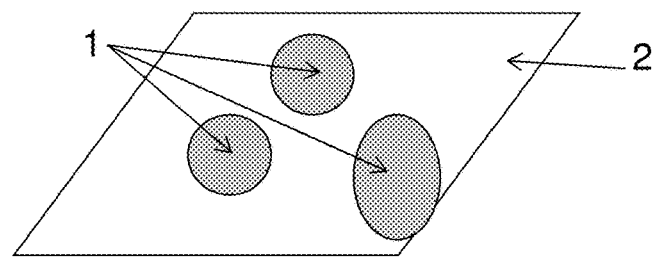
Figure 2E:
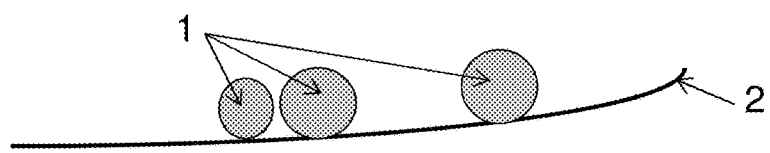

Method for Manufacturing Composite Proppant Shown in FIG. 2c.

A disk of diameter 10 cm was cut from water-soluble film GUNOLD® Solvy®.
A weighed quantity of 2.6 g of ceramic propping agent was taken.
The film was placed in a Petri dish, and then the film surface was uniformly wetted with a small amount of water using pipette or spatula/brush.
Proppant particles were poured onto the wetted film surface along with uniform distributing of particles with the use of a brush.
If the amount of water is sufficient for film to start softening of surface, and the film surface has become/is becoming wavelike, the sample was placed for drying up under a press, for example, in the form of the Petri dish with a smaller diameter.
The obtained sample was dried up in the drying furnace at a temperature of 40-60° C.

The dried-up sample was cut into fragments/pieces of the desired size, for example, 2×2 mm, using scissors or cutter.

Method for Manufacturing Composite Proppant Shown in FIG. 3c.

A disk of diameter 10 cm was prepared from the PLA woven sheet (NatureWorks LLC.).

A weighed quantity of 2.5 g of ceramic proppant Carbo-Prop 1218® was taken.

The woven sheet disk was placed in a Petri dish, and then its surface was uniformly treated with a small amount of epoxy adhesive using a brush.

Propping agent particles were poured onto the treated sheet surface along with uniform distributing of particles with the use of a brush/spatula.

The obtained sample was placed under a press (for example, the Petri dish with a smaller diameter) and dried up at room temperature.

The dried-up sample (woven sheet disk with glued ceramic propping agent particles) was ground to particles of size 3×3 mm using scissors.

Method for Manufacturing Composite Proppant Shown in FIG. 3a u 3b.

PLA fibers (wound bundle), class 6202D, were prepared. The fibers were cut to bundles of length 4-6 mm.

A weighed quantity of 0.5 g of fibers in bundles was taken.

A weighed quantity of 2.5 g of propping agent with polymer coating Optiprop G2 2040® was taken.

Sand was placed in a ceramic round-bottomed cup and wetted with small amount (approximately 1 ml) of PLA solution in acetone to be used as an adhesive.

The weighed quantity of particles was stirred with spatula until the polymer was uniformly distributed over particles, the solvent was nearly evaporated, but the particles remained sticky.

The bundles of fibers were placed in the cup comprising particles and distributed throughout the entire volume with spatula, slightly separating particles. Stirring was continued until the entire solvent was evaporated and sand particles stopped sticking to each other.

The obtained sample of composite proppant with bundles of fibers or separate fibers was distributed in an even layer in a Petri dish, after which the sample was left under power condition until the adhesive dried fully.

Method for Manufacturing Composite Proppant Shown in FIG. 4a-4c.

2 disks of water-soluble film GUNOLD® Solvy® with the diameter of 10 cm were prepared.

A weighed quantity of 2.5 g ceramic proppant was taken.

One film disk was placed in a Petri dish, and then the film surface was uniformly wetted with a small amount of water using pipette or spatula/brush.

Proppant particles were poured onto the wetted film surface along with uniform distributing of particles with the use of brush/spatula.

The second film disk was placed on the proppant particles, and then the air trapped between the films was removed by careful joining and planishing film shreds from the centre edgeward using a foam sponge.

The obtained sample was placed under a press (for example, a Petri dish) and dried up at a temperature of 40-60° C.

The dried-up sample was cut into pieces of the desired size and shape, for example, 3×3 mm, using scissors or cutter. Ultimately, composite proppant according to FIG. 4c was produced.

Methods for Manufacturing a Polymer Film with an Embedded Chemical Inhibitor for Organic Scales A polymer film with an embedded organic (or inorganic) scale inhibitor was produced in laboratory conditions using the following methods.

Manufacturing a Film from Solution

A weighed quantity of polymer selected as a matrix, for example, PLA, was taken.

The polymer was dissolved in a solvent, in case of PLA—in acetone (also, a polyvinyl alcohol and water combination was used with longer duration of experiment), 30.0 wt. %.

A weighed quantity of inhibitor was taken. For example, ethylene vinylacetate in powder form was selected as an organic scale inhibitor. Phosphonic acids, for example, diethylenetriamine penta methylenephosphonic acid, were selected as inorganic scale inhibitor. Mass ratio of inhibitor and polymer may vary from 1:9 to 1:1.

The inhibitor was placed in polymer solution and stirred.

The obtained solution was uniformly distributed over smooth surface, for example, poured in a thin layer in Petri dishes, then the films were left until they dried fully to the constant weight, after which films were separated from the bottom of Petri dishes and used to create samples of composite proppant with polymeric carrier (see examples above).

Manufacturing a Film from the Melt

A weighed quantity of polymer selected as a carrier, for example, PLA, was prepared.

A weighed quantity of inhibitor was prepared.

Pellets of polymer selected as a carrier were ground and mixed.

A melt of mixture was prepared under continuous stirring.

The polymer melt was distributed in a thin layer in a Petri dish and left to cure.

The obtained films were separated from substrate (i.e. the bottom of Petri dish) and used to prepare samples of composite proppant with polymeric carrier.

In industrial conditions, films filled with inhibitors can be manufactured by the method of film-formed polymer extrusion.

Method for Manufacturing a Composite Proppant Containing an Organic Scale Inhibitor in a Polymer Shell A weighed quantity of 100 g of ceramic proppant (or natural sand) was prepared.

A weighed quantity of 1 g of scale inhibitor was prepared.

A weighed quantity of 3 g of PLA to be used as a base (matrix) of polymer shell was prepared.

The polymer shell was ground and placed in a ceramic cup.

The inhibitor was mixed with the prepared degradable polymer.

A melt of mixture was prepared under continuous stirring of mixture. The temperature treatment conditions depend on the selected PLA class; in this example, the melt temperature of PLA matrix was 240° C.

Keeping the "polymer-inhibitor" shell melt from being cooled, the proppant particles are placed in the ceramic cup comprising the melt.

Under continuous stirring and separating particles with spatula or blade agitator, the polymer-inhibitor mixture was distributed over the surface of particles, then the mixture was allowed to cool and the melt was allowed to cure thus forming the composite proppant shell.

Using the "through solution" technology to fill polymer with inhibitor, the polymer, solvent, inhibitor and propping agent are placed in the ceramic round-bottomed cup in that order under continuous stirring. In this case, duration and ambient conditions of the process of applying polymer shell onto propping agent depend on the solvent in use.

Determining the Settling Rate of Composite Proppant with a Carrier Based on Film-Forming Polymer The settling rate of solid particles attached to a carrier based on film-forming polymer was determined in the course of experiment.

Ceramic proppant ForeProp 1630® with the average diameter of particles of approximately 0.1 cm and apparent density of 2.84 g/cm³ was used as solid particles, while cut polymer disks were used as a carrier (see Table 1).

TABLE 1

Properties of Polymeric Carrier (Disk)

| Diameter, cm | Thickness, μm | Density, g/cm³ | Material |
|---|---|---|---|
| 0.45 ± 0.05 | 250 ± 1 | 1.35 ± 0.02 | polyamide |

Preparing a Sample.

A polymer disk (polyamide) was wetted with a small amount of epoxy adhesive, propping agent particle(s) was (were) placed on the gluing surface in a random way. The maximum quantity of propping agent particles on the disk was 10. The sample was dried up at room temperature during 24 hours.

The produced composite particles were settled in water adding SAA (surface-active agent Fairy, 1 ml/l) in a vertical slot with height of 100 cm and clearance thickness of 1 cm and with smooth walls (organic glass). The settling time was measured during experiment (averaging by thirty experiments). The results shown in Table 2 were obtained.

TABLE 2

Setling Rate of Composite Proppant

| Sample | Composite Proppant and its Components | Settling Rate, mm/s |
|---|---|---|
| 1 | Polymer disk (no particles) | 36 |
| 2 | Solid particle (spherical ceramic proppant) | 170 |
| 3 | Polymer disk + 1 solid particle (ρ = 1.41 g/cm³) | 48 |
| 4 | Polymer disk + 2 solid particles (ρ = 1.47 g/cm³) | 62 |
| 5 | Polymer disk + 3 solid particles (ρ = 1.52 g/cm³) | 66 |
| 6 | Polymer disk + 10 solid particles (ρ = 1.79 g/cm³) | 100 |

The settling rate is measured as the ratio between the slot depth and the time of particle travel from the surface to the bottom of the slot.

Lines 1 and 2 show the settling rate separately for composite proppant components.

It has been demonstrated in the course of experiment, that the composite proppant according to the present disclosure (lines 3-6) has a much lower settling rate compared to solid particles (line 2). As the quantity of solid particles on the polymer disk (carrier) increases, so does the settling rate. Besides, the polymer disk fully covered with solid particles (maximum 10 in quantity), has a lower settling rate compared to solid particles of proppant without polymeric carrier.

The foregoing disclosure was presented in the form of different specific embodiments of the present disclosure that offer a number of advantages compared to the prior art. In the meantime, it should be noted that the present disclosure is not limited to the above specific embodiments of the present disclosure, so various modifications and changes can be made therein without departing from the essence of disclosure which is expressed in the claims attached.

The terms "comprises", "includes" and the like are used herein in the non-limiting sense, i.e. in the sense of open list, and not in the exclusive sense, so they do not preclude presence of other possible components, features, stages, etc. The term "consisting of" is used in the limited sense.

The invention claimed is:

1. A method of manufacturing a composite proppant, comprising:
    (a) producing at least one polymeric carrier with inclusions of at least one inorganic or organic scale inhibitor;
    (b) attaching at least one proppant particle to the at least one polymeric carrier; and
    (c) dividing the produced polymeric carrier to smaller-in-size fragments with the at least one proppant particle attached,
    wherein, at stage (a), the at least one polymeric carrier is produced in the form of a film which is prepared by applying an adhesive coating or by molding to accommodate the at least one proppant particle;
    wherein, at stage (b) the at least one proppant particle is delivered to a preliminarily prepared film, then the at least one proppant particle on the preliminarily prepared film is coated by another film layer of a second polymeric carrier, following which both films with proppant particles between them are passed through roll mills, thus producing a sheet; and
    wherein, at stage (c) the sheet produced at stage (b) is cut into fragments.

2. The method of claim 1, wherein the at least one polymeric carrier is substantially produced having a plate shape.

3. The method of claim 1, wherein the attaching is implemented by gluing the at least one proppant particle to the at least one polymeric carrier.

4. The method of claim 1, wherein the attaching is implemented by embedment of the at least one proppant particle into the at least one polymeric carrier.

5. The method of claim 1, wherein the dividing is implemented by cutting.

6. A method of manufacturing a composite proppant, comprising:
    (a) producing at least one polymeric carrier in the form of a fiber net, wherein the carrier comprises inclusions of at least one inorganic or organic scale inhibitor;
    (b) cutting the produced fiber net into fragments; and
    (c) coating at least one proppant particle with an adhesive compound and mixing the at least one proppant particle with the net fragments, thus ensuring that the at least one proppant particle and the net fragments stick to each other.

7. The method according to claim 1, further comprising:
    mixing the at least one scale inhibitor and a film-forming polymer to produce a mixture;
    applying the produced mixture onto the at least one proppant particle; and
    drying the at least one solid particle at a film-forming temperature to produce an outer coating on the at least one proppant particle.

8. The method of claim 7, wherein the film-forming polymer is mixed in a liquid state.

9. The method of claim 7, wherein the at least one proppant particle is a porous particle.

10. The method of claim 7, wherein the produced mixture is applied onto porous particles through impregnation of each porous proppant particle using solution or melt of paraffin wax inhibitor, asphaltene organic scale inhibitor or both.

\* \* \* \* \*